United States Patent [19]
De Graff

[11] 3,844,898
[45] Oct. 29, 1974

[54] FRACTIONATION APPARATUS HAVING PLURAL, INTEGRAL AND CONCENTRIC FRACTIONATING UNITS

[75] Inventor: Richard R. De Graff, Arlington Heights, Ill.

[73] Assignee: Universal Oil Products Company, Des Plaines, Ill.

[22] Filed: Jan. 2, 1973

[21] Appl. No.: 320,247

[52] U.S. Cl................. 202/154, 202/158, 196/100, 203/DIG. 19
[51] Int. Cl............................................ B01d 3/26
[58] Field of Search........ 202/154, 158; 203/99, 71, 203/81, 74, DIG. 19; 196/100, 105, 139; 62/23, 24, 31; 261/113, 114

[56] References Cited
UNITED STATES PATENTS

| | | |
|---|---|---|
| 1,257,470 | 2/1918 | Filippo et al........................ 202/158 |
| 1,919,599 | 7/1933 | Schonberg......................... 202/158 |
| 2,134,836 | 11/1938 | Ostergaard......................... 196/139 |
| 2,578,469 | 12/1951 | Goldsbarry......................... 196/105 |
| 3,502,547 | 3/1970 | Bridgeford......................... 202/158 |

*Primary Examiner*—Wilbur L. Bascomb, Jr.
*Attorney, Agent, or Firm*—James R. Hoatson, Jr.; Robert W. Erickson; William H. Page, II

[57] ABSTRACT

Insertion of about one half of a small diameter distillation column through the bottom of a larger diameter column permits the fractionation of a feed stream fed to the small column into three distinct high purity streams within one vessel. An annular space between the two columns functions as a stripping section which produces a pure stream of intermediate boiling range material. Open communication between the columns at the top of the small column eliminates the requirement of having a separate reflux system for the small column.

7 Claims, 2 Drawing Figures

3,844,898

FRACTIONATION APPARATUS HAVING PLURAL, INTEGRAL AND CONCENTRIC FRACTIONATING UNITS

BACKGROUND OF THE INVENTION

1. Field of the Invention

The invention relates to an apparatus for the fractional distillation of hydrocarbons or other organic compounds, and is specifically directed to a single vessel apparatus in which fractional distillation is performed to produce more than two high purity product streams, and which contains at least two rectification zones and two stripping zones.

2. Description of the Prior Art

There is a large body of knowledge in the field of fractionation, wherein the uniformly used method to produce three separate high purity fractions employs two distinct vessels, such as two columns, connected so to separate out one fraction from the mixture in a first column, and to separate the other two fractions in the second column. The apparatus of the present invention uses only one vessel, but has more than one rectification and stripping section located within this vessel. In the prior art, a separate external reflux system is located at the top of each rectification section and each column rests on a separate foundation. The prior art also includes stacking two fractionation units within the same vessel to reduce capital costs. The present invention is distinguished by the open communication between the units, and by their telescopic interposition.

SUMMARY OF THE INVENTION

By the vertical interposition of distinct fractionation units into a single vessel, space requirements and construction costs are reduced. The invention in the preferred embodiment comprises a topless small diameter fractionation tower which is stabbed into the bottom of a larger diameter column to form an annular overlap for about one half the height of each column. The rectification section of the bottom column is therefore at least partially within the inner most volume of the annulus, and the outermost volume of the annulus is the stripping section of the upper column. Descending liquid from the upper column is utilized as reflux for the rectification section of the bottom column and therefore no reflux system is needed for the bottom column. A separate high purity stream having an intermediate boiling range is produced as a bottoms product from the outer portion of the annulus in addition to the normal top and bottom streams.

DESCRIPTION OF THE DRAWING

The invention is illustrated in FIG. 1, wherein a feed stream entering by line 1 is fractionated into four high purity product streams labeled as A, B, C and D. This particular configuration is useful when the feed stream is composed of relatively small amounts, say 10 percent, of each of the heavier compounds B, C, and D, and the remainder is the most volatile component A. The feed stream enters the outer vessel 2 at a point between the ends of the smallest column. In the sectioned part of the drawing, a number of the needed trays 3 are shown in the different zones. This divides the fractionation unit into a stripping zone 4 below the feed point, and a rectification zone 5 above the feed point and within the lower column's continuing walls 8. By the normal fractionation process, the heaviest compound, D, is concentrated in the descending liquid, and the more volatile compounds are vaporized and passed upward. The heat needed for this is supplied by a reboiler means 6 located in the bottom of the apparatus close to the point at which line 7 is used to remove a stream of high purity D.

The remaining compounds rise through the small column's rectification zone 5 which prevents D from entering the upper columns. Vapors rising out of the top of the small column are the feed to the upper column, and liquid descending through the top of the small column is the reflux to the small column. Fractionation in the bottom part of the middle column results in the purification of a stream of compound C in stripping zone 10 in the outer portion of the lower annulus. This stream is removed in line 32. Vapors for this purification are derived from reboiler means 11 shown as a heat exchange tube 12 located in the bottom of the middle column. Vapors rich in A and B rise through rectification zone 9 between the middle column's continuing walls 22 which extend into the upper column forming a second annulus.

Figure 1:
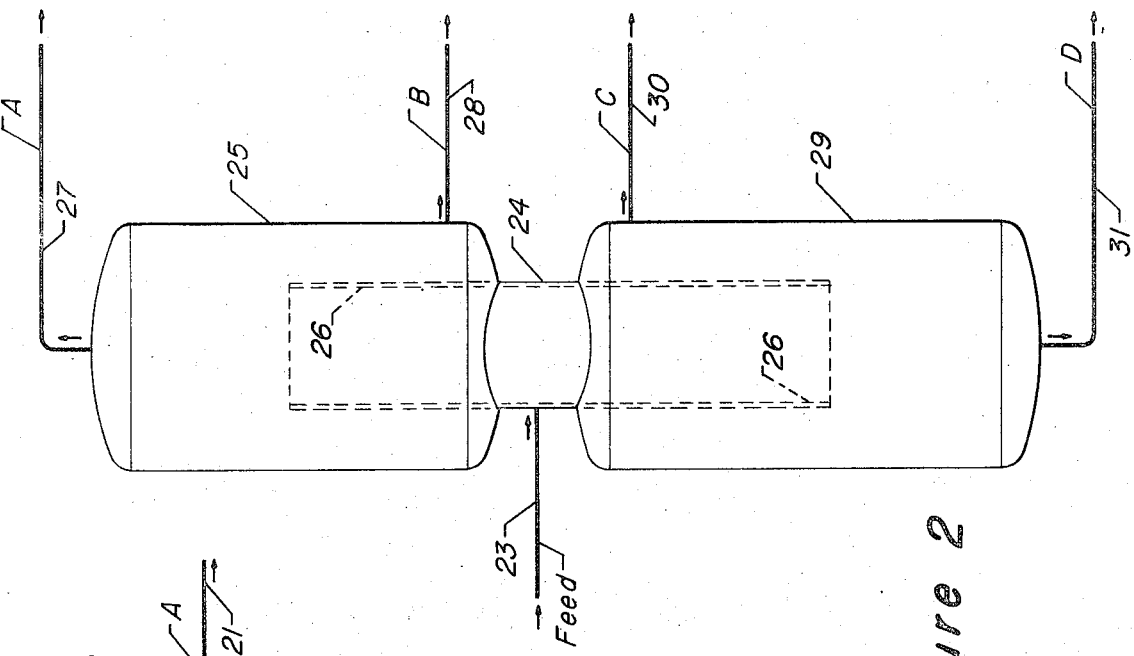

The vapors leaving the top of the middle column are fractionated into a stream of liquid B withdrawn in line 14 from the bottom of stripping zone 17, which has reboiler means 13 as its source of heat input. A, the most volatile compound, is concentrated in rectification zone 16, which produces a vapor stream removed in line 18. This vapor stream is then passed through cooler 19 to cause its condensation into liquid which is collected in receiving vessel 20. Part of this liquid is returned to the apparatus in line 15 as reflux, and a second part is removed in line 21 as a product stream.

This description and drawing of a preferred embodiment art intended to present only the basic principles of the invention, and are not intended to limit its application to this specific embodiment. For the purposes of simplicity and clarity, needed process equipment such as valves, pumps and controls have not been shown. Modifications to adapt the present invention to a wide variety of possible applications are within the scope of this specification.

Figure 2:
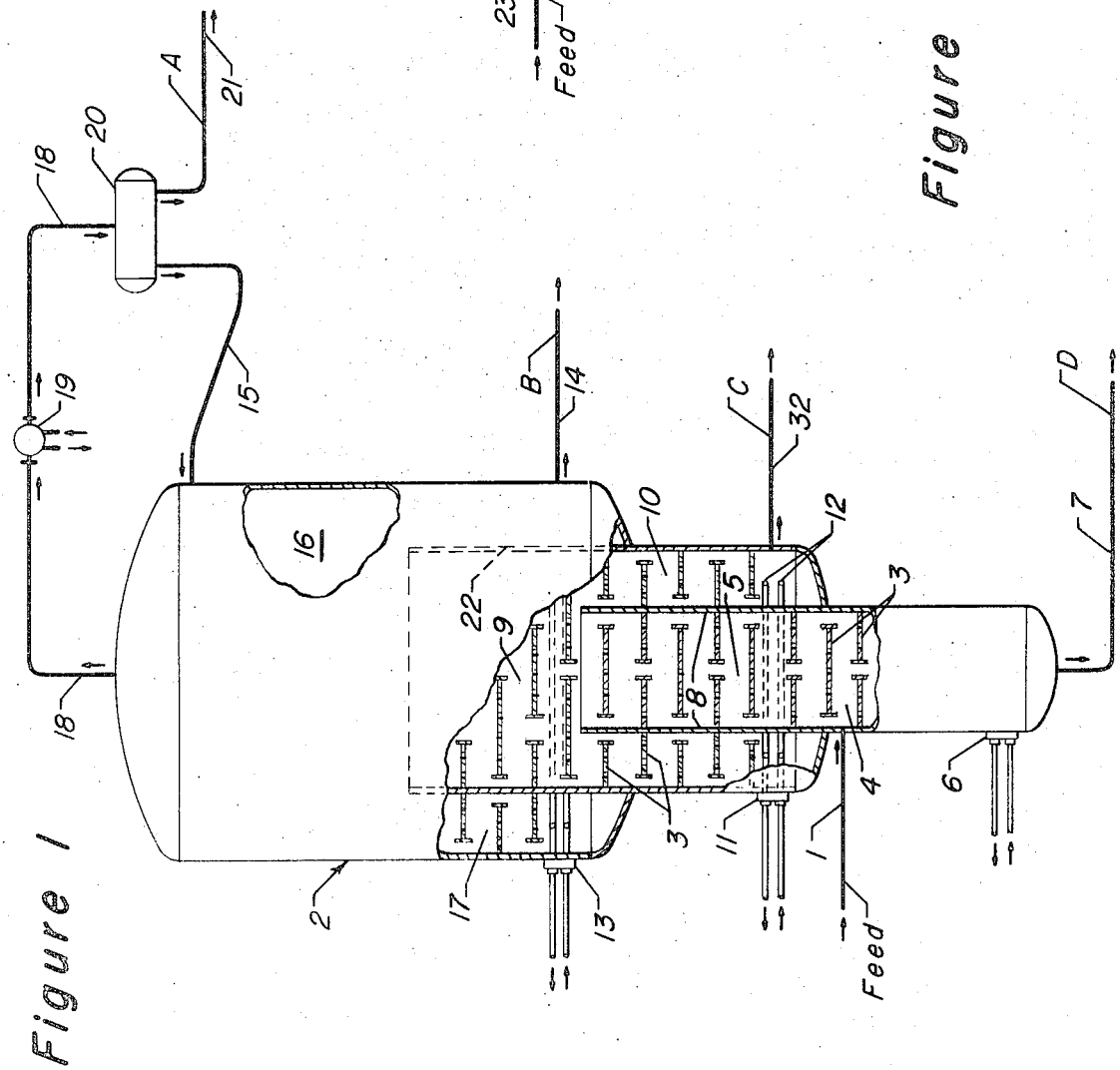

One possible modification is shown in FIG. 2, a schematic showing how the present invention may be adapted to the separation of a feed stream composed of about 50 percent A and B and about 50 percent C and D. The feed enters a smaller middle fractionation unit 24 through line 23 and is split into a light fraction composed of A and B and a heavy fraction composed of C and D. The lighter fraction is the product of the rectification section of the middle column which is located between walls 26 extending into the upper column 25. The feed point of this upper column is the open end of the middle column. The upper column then splits the fraction into high purity streams of A and B, with A leaving by line 27 and B by line 28.

The heavier fraction of the mixture is purified in the stripping section of the middle fractionation unit 24, and is then split into its pure components in the lower column 29. C is removed from the rectification section of the lower column by line 30, and D is removed from the stripping section through line 31. Ideally, this three column apparatus would require a total of only two reboilers, one in the top column and one in the bottom column, and a total of only two reflux systems with one located in the top of each column.

DETAILED DESCRIPTION OF THE INVENTION

Fractionation employs a multiplicity of distillation, or vapor-liquid equilibrium, stages stacked upon one another inside a vessel to separate mixtures of substances having different boiling points. Each stage utilizes a support, such as a tray, for the liquid phase constructed to maintain a liquid level on each tray to cause contact and mixing of the vapor and liquid. Fractionation can also be performed in a column filled with regular shaped material referred to as packing, which provides surface area for vapor-liquid contact, pockets to hold liquid, and openings for vapor and liquid flow.

The method is the same with both types of columns. Lower boiling, more volatile, components contained in the liquid pass into the vapor phase in an attempt to reach equilibrium. The vapor formed in each level is therefore relatively rich, as compared to the liquid, in the more volatile components. These volatile components gradually move stage by stage to the top of the column as the vapor rises. In the next higher stage, the vapor contacts slightly cooler liquid and a partial condensation of some of the vapor occurs, with the heavier, less volatile components being more readily condensed. The heat liberated by this condensation causes the vaporization of some of the more volatile material contained in the liquid contained on the tray. This causes the further enrichment of the vapor phase which rises from this tray in the more volatile component. This cycle is repeated at each contacting point whether it is a piece of packing or a tray. Since the vapor and the liquid change in composition at each stage, there is no real countercurrent flow through the column of separate, independent vapor and liquid streams. The actual flows are from one stage to another, with each vapor stream and each liquid stream being slightly different from that moving between the adjacent stages. There are, however, two net flows through the column. First, there is the flow of the more volatile components upward from the feed tray, and second, there is the flow of the less volatile components downward.

The feed stream is normally introduced at some point near the middle of the column, and marks the division between a stripping section, defined as the section of trays above the feed point, and the rectification section, defined as the section of trays below the feed tray. Rectification refers to the purification of a distillate, and stripping refers to purification of a bottoms stream. Rectification occurs as the less volatile (heavy) components of the vapor transfer into the liquid phase. A liquid stream, called reflux, formed by the condensation of vapor removed from the top of the column is fed to the top tray to provide the liquid phase needed for the necessary vapor-liquid contacting. The low concentration of the less volatile components in the reflux makes it a very effective liquid for this application. The portion of the condensed overhead vapors not used as reflux is removed as a distillate product stream.

Stripping occurs in the section of the column below the feed point as the more volatile (light) components transfer into the vapor phase and the heavy components descend to the bottom of the column. The vapor phase is produced by a heating means in the bottom of the column referred to as a reboiler, and initially has a relatively low concentration of the more volatile component. It is a common practice to form a vapor phase by heating a portion of a product stream being removed from the bottom of the column in an external reboiler.

Either a rectification section or a stripping section is required for each pure product stream removed from a fractionation column. To illustrate this point, if it is assumed that three compounds, A, B, and C, are to be separated, it is necessary to first separate out one of the compounds, for example A, and then to split the other two. To perform this, the mixture of the three compounds is fed to a first fractionation zone operated at conditions set to either remove the most volatile compound, A, as the overhead product or the least volatile compound, C, as the bottoms product. The two remaining compounds, B and C or A and B, are withdrawn from the opposite end of this first fractionation zone and fed to a second fractionation zone which removes the most volatile remaining compound as an overhead product and the less volatile compound as a bottom product. If this separation of three compounds was attempted in a single fractionation vessel by withdrawing compound B as a sidecut taken between the feed point and either end of the vessel, the sidecut would be contaminated by a second compound, either A or C, being removed at that end of the vessel. The liquid removed from the sidecut tray is in contact with the vapor or liquid carrying the second compound to the ends of the vessel and this contamination is therefore unavoidable. This problem is solved in a crude oil column used to separate the raw crude into several different product cuts by steam stripping each side cut that is removed in a second column, and then returning the light material stripped out to the crude column above the point where the sidecut is removed.

An object of the present invention is to perform a separation of three or more compounds into pure streams in a single outer vessel. In this discussion, the word vessel is intended to mean an independent structure enclosing several fractionation sections. A normal fractionation column would be considered a single outer vessel containing one fractionation unit consisting of one stripping section and one rectification section. A second object of the present invention is the reduction of initial construction costs of a fractionation system designed to produce more than two pure product streams. A further object of the present invention is the reduction of the cost of operation of a fractionation system designed to produce more than two pure product streams during periods of operation when only two product cuts are required.

A preferred embodiment that is different from that shown in the drawing consists of only two fractionation units, with the small diameter fractionation unit stabbed into the bottom of a larger diameter unit. A feed stream mixture is introduced near a midpoint of the lower unit. The bottom part of the lower fractionation unit is a stripping section where the least volatile component is removed from the apparatus. This section by itself is identical to the prior art. The top part of this lower unit is a rectification section which functions similar to the prior art in assuring that very little of the least volatile components reaches the upper sections of the apparatus. It differs from the prior art in that it has no external reflux means other than that located in the unit above it, and because it is in open communication with this upper unit. The remaining lighter portion of the feed mixture passes through the top of this lower unit as the feed to the upper fractionation unit. The outer part of the annulus formed by the overlapping units is the bottom part, or stripping section, of the upper unit. A second pure component stream is removed from this bottom section in a normal manner and consists of middle boiling range material. The lightest components in the feed are purified in the uppermost rectification section of the vessel where an external reflux system is located to supply the necessary liquid reflux to the entire apparatus. This preferred embodiment therefore utilize one vessel containing two stripping sections, two rectifying sections, one reflux system and two reboilers to produce three high purity products.

The embodiment shown in FIG. 1 of the drawing is an expansion of the above described embodiment to include three fractionation units. It would be used when the feed stream contained only low percentages of three heavy components. The number of individual units which may be stacked on top of one another is limited by the practicality of operation, and by design considerations based on the maximum rate at which vapor and liquid can be transported through the smaller sections of the vessel without impairing operation.

A third embodiment shown in FIG. 2 utilizes the present invention within the upper two fractionation units. A small diameter column is stabbed into the top of one column and the bottom of another. The feed stream, which is to be fractionated into four pure streams, is fed to the apparatus somewhere near the middle of the small column and split into a light and a heavy fraction. Each of these fractions is then split in the large diameter units into two pure streams. Reboilers would be located at the bottom of these large units and reflux systems at the top. Reboiler and reflux systems could be installed in the small diameter, but are not a necessity due to the free passage of vapor and liquid from the other units.

There is no requirement that the two larger columns have the same diameter or type of internal construction. It is also possible for the stripping and rectification sections of a single unit to differ in size or design. Therefore, the stripping section of a lower column may be as large as the rectification section of the upper column. This would be the case if the outer vessel was cylindrical and the rectification section of the lower unit had a smaller diameter than the stripping section. A cylindrical outer vessel would reduce design problems encountered in supporting the upper units.

Construction costs are lowered by the use of a single foundation where two were required in the prior art, by the possible use of a lower gauge metal in the rectification section of the lower fractionation unit, and by the elimination of reflux system piping and controls.

Since the feed to the upper units is in the form of a vapor, a greater amount of cooling capacity is required on the reflux systems of these units. However, this increase in the cooling requirements is balanced by the absence of a reflux system in the bottom unit, and by a reduction in reboiler duty of the upper units. Actually, the cooling is just performed in another location. It should be noted that with the method of the present invention, the feed preheat to the upper units is obtained for free since the feed is already vaporized.

The design of the vessels, trays, reflux and reboiler systems will vary with the material being fractionated and flow rate of the feed stream. Details of the many possible internal and external variations of the present invention are well known to those skilled in the art of fractionation.

Since in most cases it is the rate of vapor passage that is the controlling design factor in sizing a column for the required diameter, the area of the rectification section of the lower fractionation unit will be determined by the quantity of top and middle product stream material in the feed stream, which is the amount of vapor which must travel upward through the inner section. The height of an outer annular section will be set by the minimum number of fractionation stages required to assure that a high purity middle product stream is produced. The feed stream may be charged to the lower unit at any point and is not restricted to the location shown on the drawing. The design criterion for placement of the feed point is the adequate rectification of the material which is discharged from the top of the inner, lower, unit.

To produce three pure product streams the feed stream must enter the apparatus by the lowest stabbed-in fractionation unit. It is important to emphasize that the feed stream must enter the lowest unit which is stabbed into another unit. If, as in the drawing, each unit is larger than the one below it, this is the same as saying the feed must be to the smallest unit. If the feed stream is charged to a different unit, at least one of the products will not be of high purity although the others may be unaffected. This can be easily visualized by referring to the drawing. If the feed point is moved up to a point in the middle fractionation unit, at least some of the heaviest components which would normally descend to the bottom of the smaller unit will descend instead into the outer section of the annulus and become trapped. The middle product stream will then be contaminated with the heaviest component. This same entrapment would occur if the feed stream entered the largest unit in FIG. 1 or the upper large unit in FIG. 2. If the feed in FIG. 2 was directed to the lower large unit, some light material would be trapped instead.

I claim:

1. A fractionation apparatus capable of producing four pure component streams which comprises:
   a. a lower first, a second intermediate and an upper, third fractionation unit, each of said units being cylindrical in cross-sectional configuration, each of said fractionation units having an upper rectification section and a lower stripping section, the said lower first unit being of less diameter than the second intermediate unit and extending concentrically into said second intermediate unit a substantial distance, said second intermediate unit extending concentrically into said upper, third fractionation unit a substantial distance, whereby a first annular chamber is provided between said first and second units and a second annular chamber is provided between said second and third units, each of said annular chambers having a series of fractionation trays therein;
   b. means to introduce a feed stream to the apparatus at a point located between the top and bottom of said lower first fractionation unit;

c. reboiler means located near the bottom of the stripping section of each of said fractionation units;

d. means to provide external reflux to the rectification section of the upper third fractionation unit;

e. means to remove a product stream from the bottom of each of said stripping sections; and f. means to remove a product stream from the top of the rectification section of the third fractionation unit.

2. The apparatus of claim 1 wherein the rectification and stripping sections of said lower first fractionation unit have the same cross-sectional area.

3. The apparatus of claim 1 wherein the rectification and stripping sections of said upper, third fractionation unit have the same outer diameter.

4. The apparatus of claim 1 wherein the rectification section of said upper, third fractionation unit has substantially the same cross-sectional area as the stripping section of the next lower unit.

5. The apparatus of claim 1 wherein, a reboiler means is located near the bottom of each unit and a reflux system is located on the uppermost unit.

6. The apparatus of claim 1 wherein each stripping section has a reboiler means and each rectification section has a reflux system.

7. The apparatus of claim 1 wherein said substantial distance of extension of said lower first unit into said intermediate unit and said substantial distance of extension of said second intermediate unit into said upper, third unit is in the amount of about one half the height of said lower first unit and said second intermediate unit respectively.

* * * * *